United States Patent
Gruninger

(10) Patent No.: US 7,510,246 B2
(45) Date of Patent: Mar. 31, 2009

(54) SEAT-MOUNTED CARGO HARNESS

(75) Inventor: Michael R. Gruninger, Hildisrieden (CH)

(73) Assignee: Great Circle Services, Ltd. (CH)

( * ) Notice: Subject to any disclaimer, the term of this patent is extended or adjusted under 35 U.S.C. 154(b) by 0 days.

(21) Appl. No.: 11/671,192

(22) Filed: Feb. 5, 2007

(65) Prior Publication Data

US 2007/0182234 A1    Aug. 9, 2007

(30) Foreign Application Priority Data

Feb. 3, 2006    (CH) .................................... 0173/06

(51) Int. Cl.
*B60R 22/00* (2006.01)
(52) U.S. Cl. ...................................... 297/485
(58) Field of Classification Search ................ 297/464, 297/485, 468, 469; 2/338, 308; 24/17 B; 280/801.1; 224/275
See application file for complete search history.

(56) References Cited

U.S. PATENT DOCUMENTS

| | | | |
|---|---|---|---|
| 579,818 A * | 3/1897 | Cooley | ......................... 297/468 |
| 1,048,033 A * | 12/1912 | Brown | ......................... 128/875 |
| 4,205,670 A | 6/1980 | Owens | |
| 4,834,460 A * | 5/1989 | Herwig | ......................... 297/485 |
| 5,074,588 A | 12/1991 | Huspen | |
| 5,226,698 A | 7/1993 | Harrison | |
| 5,540,403 A | 7/1996 | Standley | |
| 5,624,135 A | 4/1997 | Symonds | |
| 5,687,893 A | 11/1997 | Jacobsmeyer, Jr. | |
| 6,364,417 B1 | 4/2002 | Silverman | |
| 6,402,251 B1 | 6/2002 | Stoll | |
| 6,467,851 B1 | 10/2002 | Mannell et al. | |
| 7,073,866 B1 | 7/2006 | Berdahl | |
| 2004/0169411 A1 | 9/2004 | Murray | |

FOREIGN PATENT DOCUMENTS

GB    2275597 A    9/1994

* cited by examiner

Primary Examiner—Milton Nelson, Jr.
(74) Attorney, Agent, or Firm—Caesar, Rivise, Bernstein, Cohen & Pokotilow, Ltd.

(57) ABSTRACT

A cargo harness for securing an item resting on a vehicle seat with a back support. The harness has three belts. The first belt wraps around the seat back support and is tightened with fasteners at the end of the belt. The second belt, which is attached to the first belt, wraps around the piece of cargo in the horizontal plane and is tightened with fasteners at the end of the belt. The third belt is also attached to the first belt, and it wraps around the piece of cargo in the vertical plane and is tightened with fasteners at the end of the belt. The seat back belt and the horizontal cargo belt form a figure 8 when viewed from above. The vertical cargo belt lies in a vertical plane that bisects the ends of the figure 8.

5 Claims, 5 Drawing Sheets

SEAT-MOUNTED CARGO HARNESS

This application claims the benefit of Swiss patent application 00173/06, filed Feb. 3, 2006 with the Swiss Federal Institute of Intellectual Property.

FIELD OF INVENTION

This invention relates to the field of cargo restraints for vehicles, in particular, cargo restraints for cargo mounted on a vehicle seat.

BACKGROUND OF THE INVENTION

For many years, vehicles have included seatbelts for passenger safety. Seatbelts for passengers have been required devices in aircraft and automobiles in most countries for a long time. The benefits in limiting injury by restraining passengers in moving vehicles are well-known. The kinetic energy of a moving body when a vehicle's motion changes abruptly can be destructive and sometimes deadly. Seatbelts absorb and distribute much of that energy, greatly reducing the potential for injury. In an automobile, the seatbelt is primarily a restraint to keep the passenger from striking the vehicle interior or being thrown from the vehicle in case of collision. The primary function in an automobile is to keep the passenger from moving forward away from the seat. In aircraft, the seatbelt's primary purpose is to restrain the passenger during in-flight turbulence and in the event of abrupt strong deceleration in take-off and landing phases. While an aircraft seatbelt serves the same function as an automobile seatbelt of restraining forward motion, the more usual occurrence is passenger restraint in the vertical direction due to rapid descent, and less frequently in side-to-side directions during turbulence. Aircraft passengers that are not secured by a seatbelt during turbulence can be suddenly hurled about the cabin with great force. Aircraft seatbelts ensure passenger as well as flight safety.

Despite the known benefits of restraining passengers during flight, in most cases, cargo that is not stowed in a compartment, is usually not or ineffectively restrained. Similarly, cargo in automobile passenger compartments is rarely restrained. Depending on the direction of motion of the vehicle and the direction of the acceleration to which the cargo is subjected, unrestrained cargo on an automobile or aircraft seat holds enormous potential for causing injury and damage. The potential for damage and injury is heightened by the fact that many carry-on items, such as computer equipment and laptop computers have hard and sharp corners. The kinetic energy of unrestrained cargo, in an automobile accident or aircraft turbulence and fast deceleration, poses a serious hazard that has long gone unaddressed.

Thus, a need exists for a cargo harness for vehicle seats that is universally applicable in a diverse number of settings. Additionally desirable features are that the harness be rapidly installable and removable so that it can be carried and used by passengers or aircraft personnel, that the harness be economically feasible and that the harness be adjustable to accommodate a variety of hand-carried cargo shapes and sizes.

BRIEF SUMMARY OF THE INVENTION

A cargo harness is disclosed for securing an item resting on a vehicle seat with a back support. The harness has three belts. The first belt wraps around the seat back support and is tightened with fasteners at the end of the belt. The second belt, which is attached to the first belt, wraps around the piece of cargo in the horizontal plane and is tightened with fasteners at the end of the belt. The third belt is also attached to the first belt, and it wraps around the piece of cargo in the vertical plane and is tightened with fasteners at the end of the belt. The seat back belt and the horizontal cargo belt form a figure 8 when viewed from above. The vertical cargo belt lies in a vertical plane that bisects the ends of the figure 8.

The harness can be made of three belts or straps. Any one or all of the belts or straps can also be a cable. There can be more than one vertical strap. The harness can include various means for attaching the respective ends of each belt and tightening the ends. The harness can also be placed turned by 90° as to accommodate seats on which it is necessary to operate with a vertical cargo belt form of a figure 8 viewed from the side. The horizontal cargo belt lies in such case in a horizontal plane that bisects the ends of the figure 8.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
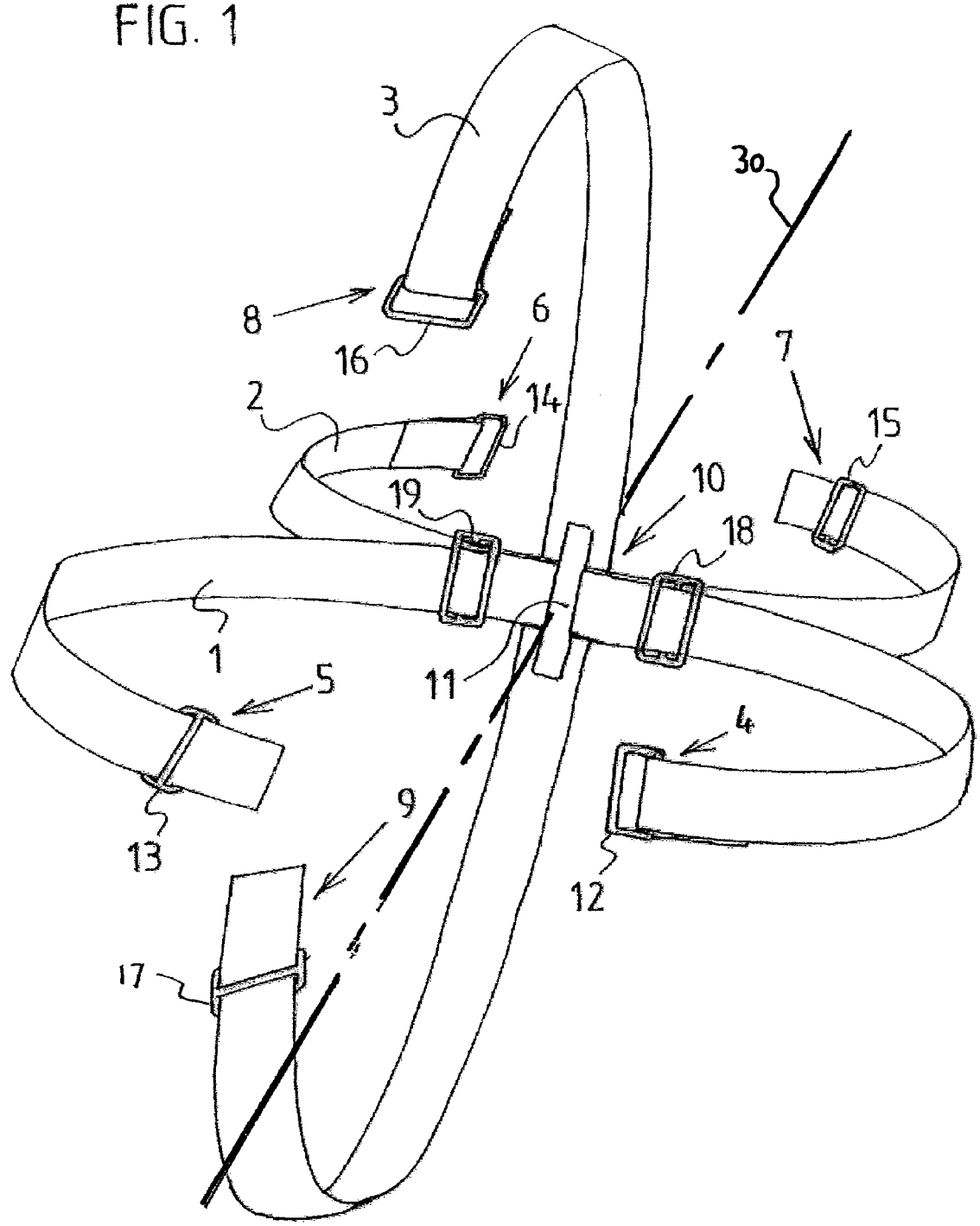
FIG. 1 is a drawing of an exemplary apparatus for fastening cargo to a vehicle seat.
Figure 5:
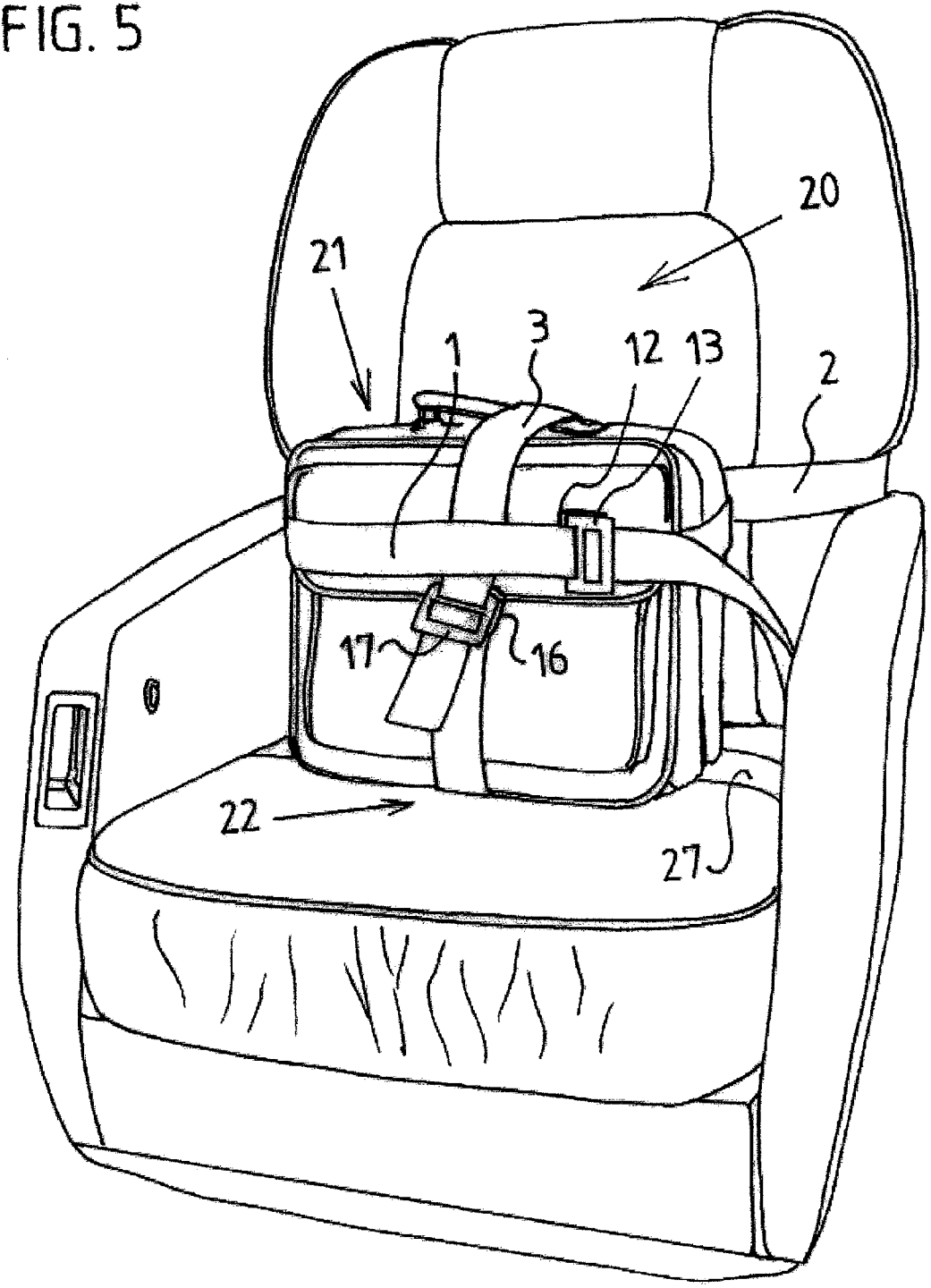
FIG. 5 is a drawing of an exemplary apparatus for fastening cargo to a vehicle seat, showing the apparatus installed on a seat and fastened to a piece of cargo.

Referring now to various figures of the drawings wherein like reference characters refer to like parts, there is shown in FIG. 1 an exemplary cargo harness comprised of three belts 1, 2, 3. Additional elements for fastening the belts together and to cargo are also shown and will be described in more detail below. FIG. 5 show an exemplary harness such as is shown in FIG. 1, installed in a seat 22 and attached to a piece of luggage 21. The exemplary harness comprises one belt 2 that is fastened around the seat back 20. A first cargo belt 1 is attached to the seat back belt 2 by two adjustable links 18 and 19. These links allow the two belts to be adjustable in the horizontal plane against each other and also allow adjustment of the points of contact between the two belts 1 and 2. The first cargo belt 1 is encircled around the subject piece of cargo 21 and is fastened tightly around the cargo by two fastening elements 12 and 13.

A second cargo belt 3 is attached at an attachment point 10 to the first cargo belt and to the seat back belt by a loop 11 of fabric affixed to the second cargo belt 3 and through which the first cargo belt and the seat back belt 1 and 2 pass. In an exemplary embodiment, the attachment means 11 is a strip of fabric 140 mm long and 25 mm wide, that is sewn or otherwise fastened to the second cargo belt 3. This embodiment has the advantage of allowing the belt that is at 90° to the seat back belt to slide along the length of the seat back belt for adjustment. The second cargo belt 3 and the attachment means 11 are configured to allow the second cargo belt 3 to encircle around the top and bottom of the cargo 21. Thus, the first cargo belt 1 and the seat back belt 2, when closed, form a horizontal figure 8, having a longitudinal axis 30, and the second cargo belt attaches to the midpoint of the two o's of the figure eight and lies in a vertical plane that passes along the longitudinal axis 30 of the figure 8.

In an exemplary design, the belts of the harness are approximately 170 cm long and 5 cm wide. In an exemplary design, the belts 1, 2, 3 of the harness are made from a sturdy heavily woven fabric made from polyester, polypropylene, Aramid™, Monofil™ or other high quality yarns, or even metal fabric. Alternatively, the belts can be made from metal or fiber cables or be a woven belt reinforced with cables. It is desirable that the materials employed conform to ISO standard 9001:2000 or similar standards that are equivalent or superior to the governmentally approved manufacturing, testing, and quality assurance standards applicable to seatbelts and other forms of passenger restraints.

Figure 2:
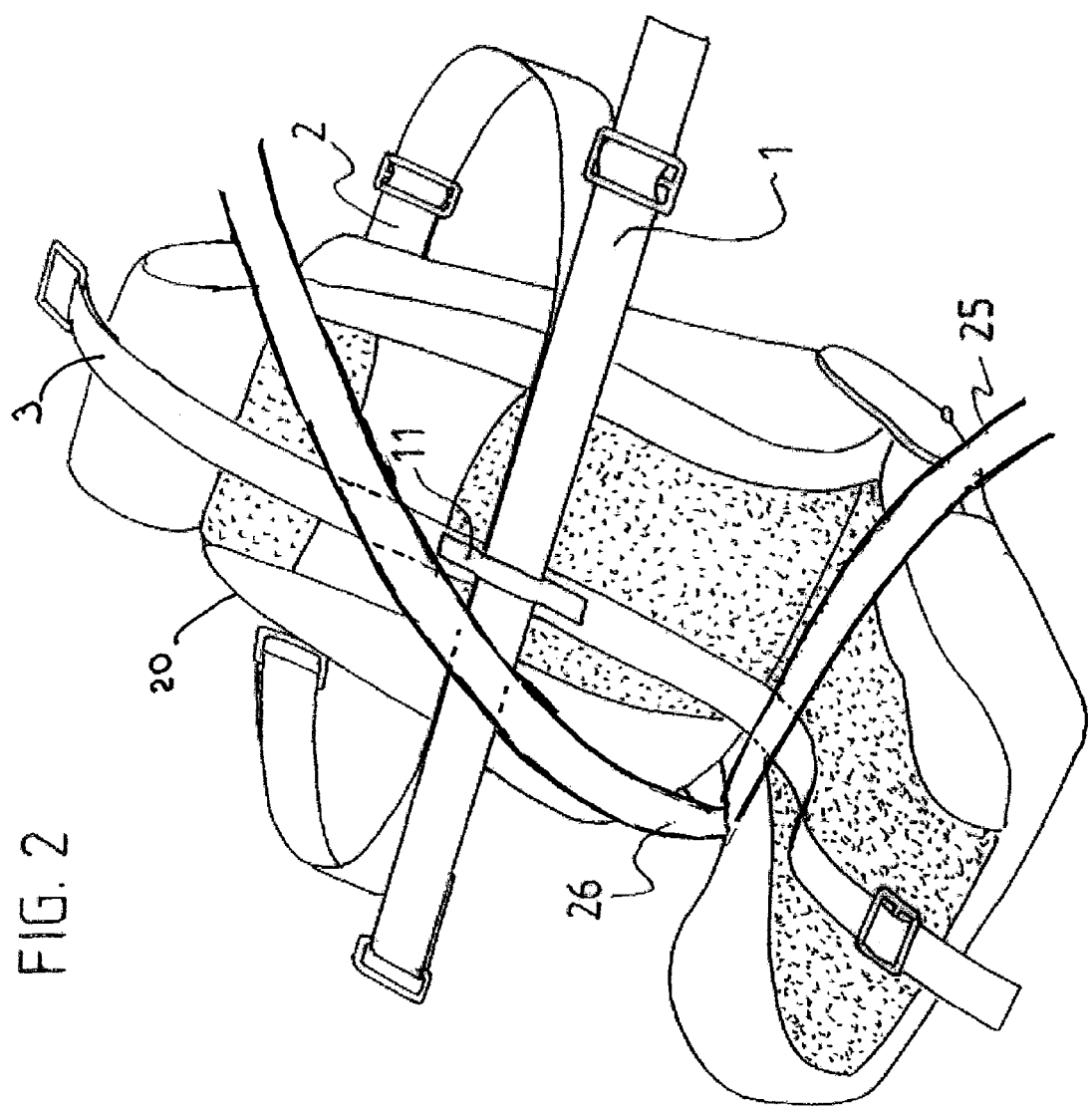
FIG. 2 is a drawing of an exemplary apparatus for fastening cargo to a vehicle seat, showing the apparatus installed on a seat.

FIG. 2 shows an exemplary cargo harness installed on a seat having a lap belt 25 and a shoulder belt 26. The lap belt 25 is passed over the second cargo strap 3 to provide additional attachment for the harness to the seat and to restrain the harness in the vertical direction. The shoulder belt 26 is passed over all three straps 1, 2, 3 to provide additional support against the seat back 20. Depending on the configuration of the seat belt 25 and the shoulder belt 26, the first and second cargo straps 1, 3 may or may not have to be open in order to pass the seat belt 25 and the shoulder belt 26 over them. For example, if the seat belt and the shoulder belt are coupled at the buckle, the harness belts must be open to close the seat belt and shoulder belts over them. In one embodiment, it may be preferable to first attach the seat back belt 2 to the seat back 20 before passing the seat belt 25 and the shoulder belt 26 over the cargo belts 1, 3. After passing the seat belt 25 and the shoulder belt 26 over the respective harness belts, the seat belt 25 and the shoulder belt 26 are tightened in the conventional manner that one would use to restrain a passenger.

In seats without shoulder belts 26, such as most airplane seats and certain automobile seats, the use of the seat belt 25 provides sufficient support to attach the harness to the seat and restrain vertical movement.

In an exemplary design, each belt has a fastener at the end portions of the belt. For example, the seat back belt 2 has a fixed fastener 14 at one end 6 and an adjustable fastener 15 at the other end 7. Likewise, the first cargo belt 1 has a fixed fastener 12 at one end 4 and an adjustable fastener 13 at the other end 5, and the second cargo belt 3 has a fixed fastener 16 at one end 8 and an adjustable fastener 17 at the other end 9.

Figure 3:
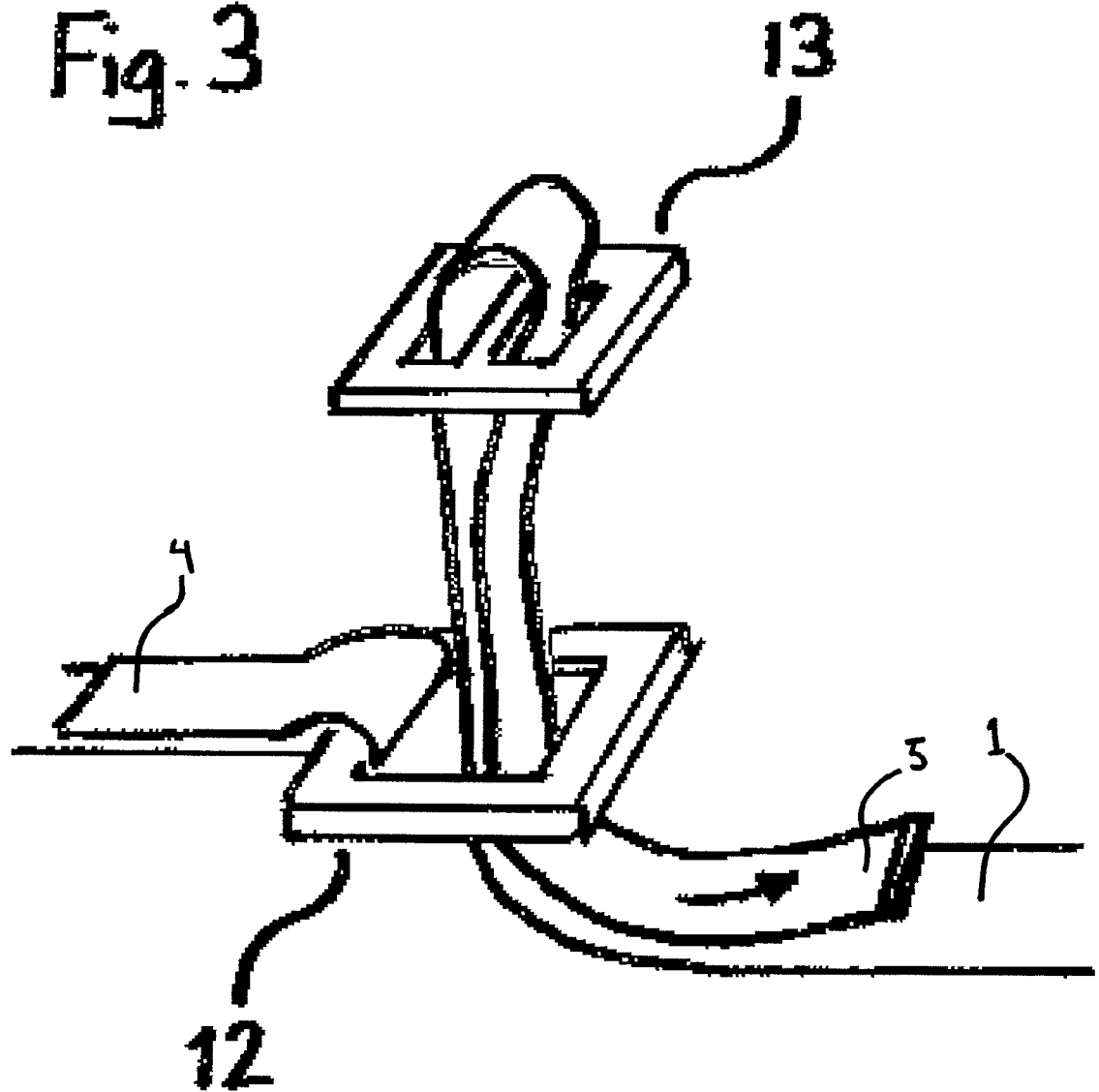
FIG. 3 is a drawing of an exemplary belt fastener.

FIG. 3 shows an exemplary pair of fasteners 12, 13 for fastening the ends 4, 5 of one harness belt 1. In this embodiment, a fixed fastener 12, is attached to a loop of fabric at one end 4 of the belt 1. The fixed fastener 12 provides an opening through which the other end 5 of the belt 1 can pass. In this embodiment, free end 5 of the belt 1 is pulled tight to tighten the belt 1 around the cargo (not shown). Once the belt 1 is tightly pulled through the fastener 12, the free end 5 of the belt 1 is passed through an adjustable fastener 13. Adjustable fastener 13 is then cinched up against fixed fastener 12 to firmly secure the belt 1 around the cargo. These fastening means 12, 13 are well known in the art as are various embodiments of the same. Adjustable fastener 13 restrains the belt 1 from movement by friction, when the belt 1 is cinched up tight in the fastener 13. Further embodiments can enhance this effect by including rough surfaces on the surface areas of the fastener 13 that contact the belt 1 when fastened. The fasteners are preferably made of high-grade steel, although they can also be made of various other high strength materials. In the embodiment shown in FIG. 3, and for belts that are 50 cm wide, the fixed fastener is approximately 30 mm by 58 mm and the adjustable fastener is 45 mm×60 mm.

In the embodiment shown in FIG. 3, the adjustable fastener 13 is preferably wider than the opening width of the fixed fastener 12 and longer than the opening length of the fixed fastener 12.

Figure 4:
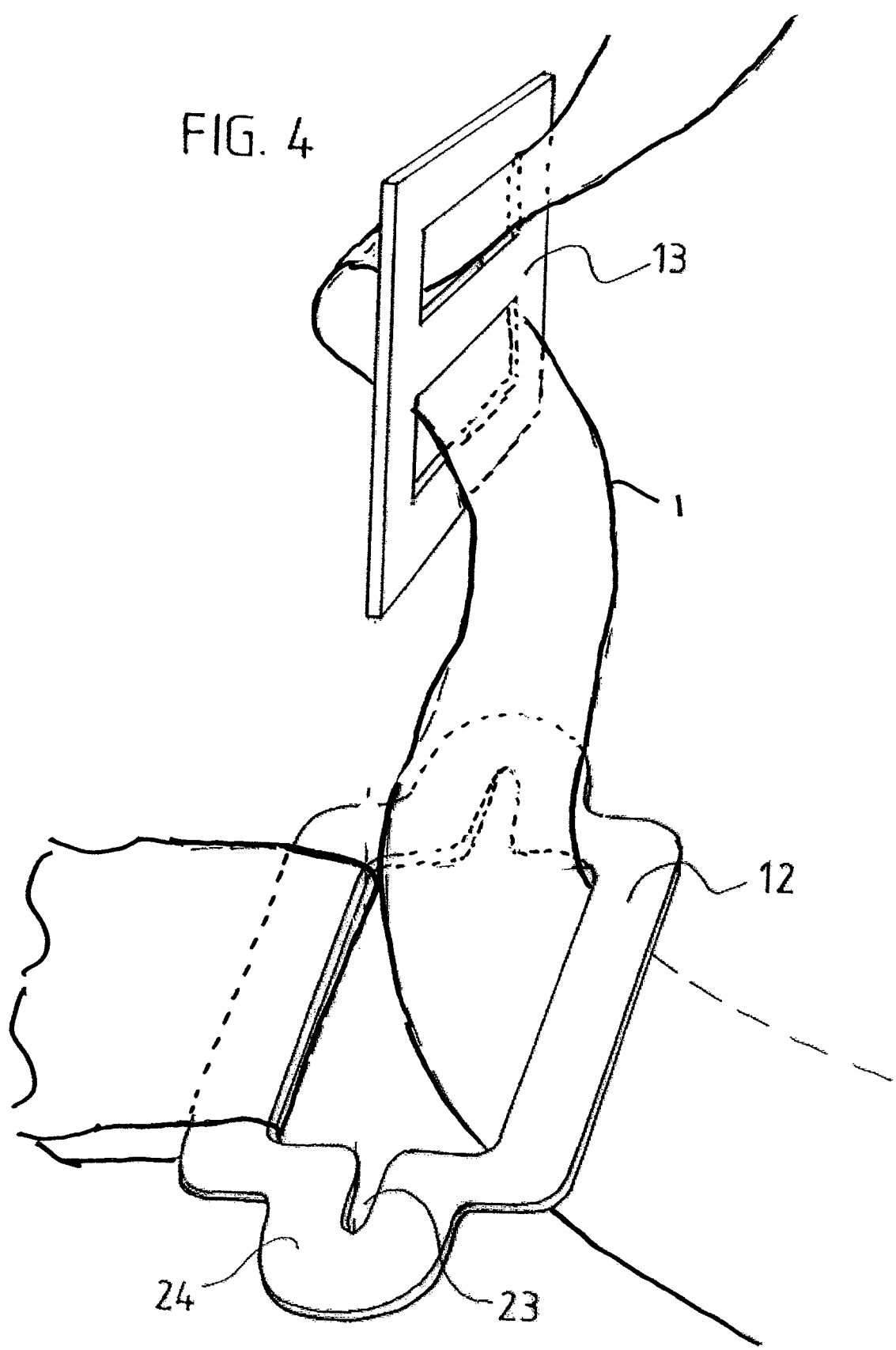
FIG. 4 drawing of another exemplary belt fastener.

FIG. 4 shows another embodiment of the belt fasteners. 12, 13. In this embodiment, a slot 23 is included in the fixed fastener 12. The slot 23 is wide enough that the adjustable fastener 13 while attached to the belt 1 can pass thorough the slot 23 in the fixed fastener 12. A tang 24 in the fixed fastener 12 accommodates the slot to minimize weight and the amount of material necessary to manufacture the fastener. This embodiment has the advantage that the adjustable fasteners, 13, 15 and 17 never have to be removed from their respective belts 1,2 and 3, thus preventing the possibility of loss.

FIG. 5 shows an embodiment of a cargo harness attached to a piece of luggage 21 and attached to a seat back 20. The method of attachment is to first attach belt 2 around the seat back 20. The fasteners for belt 2 are not shown in this figure as they are behind the seat back 20. The next step in fastening the harness to the seat 20, 22 is to pass the seat belt 27 over the second cargo belt 3. Thus, the harness is now secured against vertical and horizontal forces that might act on the luggage 21.

Once the harness is fastened to the seat 22 and the seat back 20 a piece of luggage 21 or other cargo can be fastened to the harness with the two cargo belts 1, 3, by fastening the ends of the belts around the luggage with the respective fasteners as described above. This arrangement can be used to fasten a variety of articles, including suit-cases, backpacks, brief cases, laptop bags and the like. Articles such as baskets, boxes, bags, crates and the like can also be securely fastened with this harness.

The harness takes up very little space and can therefore be easily stowed away. In addition, it is simply and easily constructed so that it can be made inexpensively enough that each seat can be equipped with one, preferably stowed in an easily accessible place.

While the invention has been described in detail and with reference to specific examples thereof, it will be apparent to one skilled in the art that various changes and modifications can be made therein without departing from the spirit and scope thereof. For example, while the embodiments described above include one vertical belt 3 encircling the piece of cargo 21, a plurality of vertical belts that are attached to the two horizontal straps 1, 2 can also be used. While the embodiments shown and described above feature two horizontal belts in the same plane, it is equally possible to have the two horizontal belts 1, 2 coupled to the vertical belt 3 at different places, such that the two horizontal belts 1, 2 are aligned in parallel planes, but are not coplanar. Also, while the embodiments described above feature two adjustable connectors 18, 19 for affixing the two horizontal belts 1,2, it is also possible to attach all three belts with a single fastener at the contact point 11. The harness can also be turned by 90° from the embodiment shown in FIG. 5 to accommodate seats on which it is necessary to operate with a vertical cargo belt form of a figure 8 viewed from the side. That is, the belt that goes around the seat back passes over the top and bottom of the seatback instead of around the sides. In this configuration, the horizontal cargo belt lies in such case in a horizontal plane that bisects the ends of the figure 8.

It is also possible to use more involved means for attaching the ends of the belts and tightening them, such as to use buckles like those on seat belts or other similar devices. It may also be desirable that the belt fastening means have provisions to allow a lock to be attached so that a key is required to remove the luggage and/or the harness from the seat. While the embodiments described above show belts or straps, any or all of the belts could be replaced with cables, especially where it is desirable to secure the item against theft.

What is claimed is:

1. An apparatus for securing an item to a seat having a back support, said apparatus comprising:

first, second and third elongate members:

each of said elongate members having first and second end portions adapted for fastening each of said elongate members into a respective loop; wherein each loop defines a respective plane;

said planes of said first and second elongate members being parallel to each other or coplanar; wherein said loops of said first and second elongate members, when viewed from a plane parallel to said parallel planes or said coplanar plane are in the shape of a figure 8, said figure 8 having a longitudinal axis;

said first and second elongate members being coupled together;

said third elongate member being adapted to form a loop in a plane that is perpendicular to the plane of said-second loop and extending along said longitudinal axis;

said first elongate member being adapted for encircling the back support of the seat;

said second and third elongate members being coupled to said first elongate member and adapted for respectively encircling an item placed on the seat to thereby releasably secure the item to the seat, wherein said second and third elongate members are of equal length wherein said first and second elongate members are coupled to said third elongate member so that said first and second elongate members can freely move in a direction perpendicular to said third elongate member.

2. An apparatus for securing an item to a seat having a back support, said apparatus comprising:

first, second and third elongate members;

each of said elongate members having first and second end portions adapted for fastening each of said elongate members into a respective loop; wherein each loop defines a respective plane;

said planes of said first and second elongate members being parallel to each other or coplanar; wherein said loops of said first and second elongate members, when viewed from a plane parallel to said parallel planes or said coplanar plane are in the shape of a figure 8, said figure 8 having a longitudinal axis;

said first and second elongate members being coupled together;

said third elongate member being adapted to form a loop in a plane that is perpendicular to the plane of said second loop and extending along said longitudinal axis;

said first elongate member being adapted for encircling the back support of the seat;

said second and third elongate members being coupled to said first elongate member and adapted for respectively encircling an item placed on the seat to thereby releasably secure the item to the seat, wherein said first end portion adapted for fastening comprises a flat rectangular plate with a first rectangular opening, said first rectangular opening having one side that is approximately the width of said elongate member of which said first end portion is a part, said elongate member being attached to said first end portion;

said second end portion adapted for fastening comprises a second flat rectangular plate that is longer and wider than the length and width of said first rectangular opening in said first end portion, said second flat rectangular plate comprising second and third rectangular openings, each of said second and third rectangular openings having one dimension that is approximately the width of said elongate member of which said first and second end portions are a part;

said second and third rectangular openings being separated by a medial portion of said flat plate and wherein said second end portion is adapted to allow said elongate member to pass through said second rectangular opening over said medial portion and through said third rectangular opening.

3. The apparatus of claim 2, wherein said first rectangular plate further comprises tangs being adapted to accommodate a slot in said first rectangular opening that is wider than the width of said second end portion.

4. The apparatus of claim 2, wherein said first and second end portions adapted for fastening are made of high grade steel.

5. An apparatus for securing an item to a seat having a back support, said apparatus comprising:

first, second and third elongate members;

each of said elongate members having first and second end portions adapted for fastening each of said elongate members into a respective loop; wherein each loop defines a respective plane;

said planes of said first and second elongate members being parallel to each other or coplanar; wherein said loops of said first and second elongate members, when viewed from a plane parallel to said parallel planes or said coplanar plane are in the shape of a figure 8, said figure 8 having a longitudinal axis;

said first and second elongate members being coupled together;

said third elongate member being adapted to form a loop in a plane that is perpendicular to the plane of said-second loop and extending along said longitudinal axis;

said first elongate member being adapted for encircling the back support of the seat;

said second and third elongate members being coupled to said first elongate member and adapted for respectively encircling an item placed on the seat to thereby releasably secure the item to the seat, wherein said second and third elongate members are of equal length wherein said first end portion adapted for fastening comprises a slot being adapted to allow said second end portion to be passed through said first end portion.

* * * * *